(12) United States Patent
Park et al.

(10) Patent No.: US 11,035,393 B2
(45) Date of Patent: Jun. 15, 2021

(54) DECOMPRESSION APPARATUS FOR SUPERHEATED STEAM

(71) Applicant: KOREA INSTITUTE OF ENERGY RESEARCH, Daejeon (KR)

(72) Inventors: Seong Ryong Park, Daejeon (KR); Chong Pyo Cho, Daejeon (KR); Jeong Geun Kim, Daejeon (KR); Seong Soo Kim, Daejeon (KR)

(73) Assignee: Korea Institute of Energy Research, Daejeon (KR)

( * ) Notice: Subject to any disclaimer, the term of this patent is extended or adjusted under 35 U.S.C. 154(b) by 0 days.

(21) Appl. No.: 16/516,422

(22) Filed: Jul. 19, 2019

(65) Prior Publication Data

US 2020/0309169 A1   Oct. 1, 2020

(30) Foreign Application Priority Data

Mar. 28, 2019   (KR) .......................... 10-2019-0035739

(51) Int. Cl.
*F15D 1/02* (2006.01)
*F22B 35/10* (2006.01)
*F22B 37/30* (2006.01)
*F22B 37/26* (2006.01)

(52) U.S. Cl.
CPC ............ *F15D 1/025* (2013.01); *F22B 35/105* (2013.01); *F22B 35/107* (2013.01); *F22B 37/266* (2013.01); *F22B 37/30* (2013.01); *Y02E 60/36* (2013.01)

(58) Field of Classification Search
CPC ...... F15D 1/025; F22B 35/105; F22B 35/107; F22B 37/266; F22B 37/30; Y02E 60/36
See application file for complete search history.

(56) References Cited

U.S. PATENT DOCUMENTS

| | | | | |
|---|---|---|---|---|
| 1,494,387 A | * | 5/1924 | Spuhr | F22B 37/30 55/345 |
| 3,312,241 A | * | 4/1967 | Bryant | F16K 3/0209 137/599.08 |

(Continued)

FOREIGN PATENT DOCUMENTS

| | | |
|---|---|---|
| JP | 1997-192026 A | 7/1997 |
| JP | 2004-231466 A | 8/2004 |

(Continued)

*Primary Examiner* — Matthew W Jellett
*Assistant Examiner* — Christopher D Ballman
(74) *Attorney, Agent, or Firm* — Rabin & Berdo, P.C.

(57) ABSTRACT

The present disclosure relates to a decompression apparatus for superheated steam comprising: a temperature raising unit having an inlet connected to an exit side of a boiler for introducing steam discharged from the exit of the boiler, and an outlet for raising the temperature of steam introduced through the inlet and discharging it; a steam utilizing unit connected to the outlet and using the steam discharged from the outlet; and a decompression unit installed at one or all of a section between the exit side of the boiler and the inlet and a section between the outlet and the steam utilizing unit, the decompression unit controlling temperature of steam while decompressing pressure of steam. According to the decompression apparatus for superheated steam, it is possible to control the pressure and temperature of steam more precisely.

15 Claims, 4 Drawing Sheets

(56) References Cited

U.S. PATENT DOCUMENTS

| | | | | |
|---|---|---|---|---|
| 4,671,214 | A * | 6/1987 | Alias | F22B 37/266 |
| | | | | 122/483 |
| 6,886,595 | B2 * | 5/2005 | James | F16K 3/0209 |
| | | | | 137/625.33 |
| 8,499,561 | B2 * | 8/2013 | Kluge | F01K 7/24 |
| | | | | 60/653 |

FOREIGN PATENT DOCUMENTS

| | | |
|---|---|---|
| KR | 10-1994-0025939 A | 12/1994 |
| KR | 10-0442560 B1 | 7/2004 |

* cited by examiner

DECOMPRESSION APPARATUS FOR SUPERHEATED STEAM

CROSS-REFERENCE TO RELATED APPLICATION

This application claims the benefit of Korean Patent Application No. 10-2019-0035739 filed on Mar. 28, 2019, in the Korean Intellectual Property Office, the entire contents of which are incorporated herein by reference.

TECHNICAL FIELD

The present disclosure relates to a decompression apparatus for superheated steam, and more particularly, to a decompression apparatus for superheated steam capable of more precisely controlling the pressure and temperature of steam.

BACKGROUND

Alternative energy is a way to solve problems such as global warming caused by the use of fossil fuels or environmental pollution problems, and its use and related research and development are increasing.

In particular, since the reserves of fossil energy are limited, the problems of environmental pollution and destruction of the ecosystem during the mining process are very serious.

Among these alternative energies, hydrogen is water and a non-toxic by-product from water.

Hydrogen exists abundantly and in an almost infinite amount in nature. Therefore, researches for the production of hydrogen for energy are actively being carried out, and at the same time, many apparatuses for producing hydrogen are also being developed.

Korean Patent Publication No. 10-0442560 was invented in view of the above, and discloses a heating element, in which it includes calcium oxide, aluminum chloride anhydride and caustic soda, aluminum metal powder and calcium chloride aqueous solution, and it uses the reaction heat generated in hydration and neutralization reactions. However, this heating element has a problem that a large amount of impurities other than hydrogen may be generated, and thus, there is a limit to use as a composition for generating hydrogen or a hydrogen generator.

Further, Korean Patent Laid-Open Publication No. 10-1994-25939 discloses a method for producing a hydrogen generator using aluminum powder or calcium oxide. However, there is a problem that may not efficiently generate a sufficient amount of hydrogen to be practically used.

Also, Japanese Patent Laid-Open No. 2004-231466 discloses a hydrogen generating material which reacts with water, including aluminum powder, calcium oxide powder, and further water-retaining agent. However, it is problematic in terms of the rate and efficiency of hydrogen generation.

Further, Japanese Patent Laid-Open No. 1997-192026 discloses a heating agent which is housed in a water-permeable envelope in which about 1% by weight of aluminum oxide is added to a mixture of 85 to 90% by weight of quicklime and 15 to 10% by weight of anhydrous magnesium. However, here, the amount of quicklime combined with anhydrous magnesium chloride is 100% by weight, and it contains only 1% by weight of aluminum oxide. Therefore, it is also insufficient in terms of the rate and efficiency of hydrogen generation.

Steam produced in SRF combustion boilers is generally a low temperature and high pressure (approximately 180° C., 7~10 bar). In order to apply it to hydrogen production systems using water electrolysis, it is necessary to produce steam at an ultra-high temperature and low pressure (approximately 700° C. or more, 3 bar or less).

When the temperature is raised by supplying thermal energy to steam according to the thermodynamic law in order to produce steam under these conditions, the pressure becomes higher together. When the pressure is lowered, the temperature is also lowered. Therefore, technical difficulties have arisen for outputting ultra-high temperature and low pressure steam, and there was a limit in accurately controlling the pressure and temperature of the output steam.

RELATED ART DOCUMENT

Patent Document

Korean Patent No. 10-0442560
Korean Patent Laid-Open No. 10-1994-0025939
Japanese Patent Laid-Open No. 2004-231466
Japanese Patent Laid-Open No. 1997-192026

SUMMARY

The present disclosure has been conceived in order to solve the above problems. The object of the present disclosure is to provide a decompression apparatus for superheated steam capable of more precisely controlling the pressure and temperature of steam.

In order to achieve the above object, the present disclosure may provide a decompression apparatus for superheated steam comprising: a temperature raising unit having an inlet connected to an exit side of a boiler for introducing steam discharged from an exit of the boiler, and an outlet for raising the temperature of steam introduced through the inlet and discharging it; a steam utilizing unit connected to the outlet and using steam discharged from the outlet; and a decompression unit installed at one or all of a section between the exit side of the boiler and the inlet (hereinafter, a first section) and a section between the outlet and the steam utilizing unit (hereinafter, a second section), the decompression unit controlling temperature of steam while decompressing pressure of steam.

Here, the decompression unit includes a plurality of perforated plates having an outer circumferential surface facing an inner circumferential surface of a pipe forming the first section or the second section, and including a plurality of perforated through hole; and a decompression valve mounted on a side of a steam output end of the first section or a steam output end of the second section of the pipe, the decompression valve dropping pressure of steam that is output by receiving driving force.

Here, the plurality of perforated plates includes a first perforated plate mounted on a steam input side of the first section or the second section, in which a plurality of first through holes are perforated in the first perforated plate; and a second perforated plate mounted on the first section or the second section, the second perforated plate being disposed between the first perforated plate and the decompression valve, in which a plurality of second through holes are perforated in the second perforated plate, where a diameter of the first through hole is larger than the second through hole.

Further, the diameters of the plurality of first through holes and the plurality of second through holes are adjustable.

Further, the plurality of perforated plates includes a first perforated plate mounted on a steam input side of the first section or the second section, wherein a plurality of first through holes are perforated in the first perforated plate; and at least one nth perforated plate mounted on the first section or the second section, the nth perforated plate being disposed between an n−1th perforated plate and the decompression valve, wherein a plurality of nth through holes are perforated in the nth perforated plate, wherein n is a positive integer of 2 or more, wherein a diameter of the n−1th through hole is larger than the nth through hole.

Further, the diameters of the plurality of first through holes and the plurality of nth through holes are adjustable.

Further, the plurality of perforated plates includes a first perforated plate mounted on a steam input side of the first section or the second section, in which a plurality of first through holes are perforated in the first perforated plate; and a second perforated plate mounted on the first section or the second section, the second perforated plate being disposed between the first perforated plate and the decompression valve, in which a plurality of second through holes are perforated in the second perforated plate, where a distance between the first perforated plate and the second perforated plate is adjustable.

Further, the plurality of perforated plates includes a first perforated plate mounted on a steam input side of the first section or the second section, wherein a plurality of first through holes are perforated in the first perforated plate; and at least one nth perforated plate mounted on the first section or the second section, the nth perforated plate being disposed between an n−1th perforated plate and the decompression valve, wherein a plurality of nth through holes are perforated in the nth perforated plate, wherein n is a positive integer of 2 or more, wherein a distance between a distance between the n−1th perforated plate and the nth perforated plate is adjustable.

Further, internal pressure of the pipe forming the first section or the second section gradually decreases from a steam input side to a steam output side.

Further, an internal temperature of the pipe forming the first section or the second section gradually decreases from a steam input side to a steam output side.

Further, the decompression valve includes a fixed perforated plate mounted on the pipe forming the first section or the second section, the fixed perforated plate being disposed on a steam output side of the first section or the second section, in which a plurality of first passing through holes having a first diameter are formed through the fixed perforated plate; a movable perforated plate capable of being lifted and lowered by receiving driving force, the movable perforated plate is disposed in contact with the fixed perforated plate, in which a plurality of second passing through holes having an entrance identical to the first diameter are formed through the movable perforated plate, in an initial neutral state before the driving force is transmitted, the plurality of second passing through holes are disposed at positions corresponding to the plurality of first passing through holes, when the driving force is transmitted, the plurality of second passing through holes gradually decrease a cross-sectional area of the plurality of first passing through holes as the movable perforated plate is lifted or lowered.

Further, in the decompression valve, each exit of the plurality of second passing through holes has a second diameter larger than the entrance of the first diameter.

Further, the plurality of second passing through holes include a diameter retaining portion for retaining the first diameter from the entrance, the diameter retaining portion being formed toward the steam output side by a certain distance orthogonally to both sides of the movable perforated plate; and a diameter enlarging portion that gradually enlarges from an end of the diameter retaining portion toward the steam output side, where an end of the diameter enlarging portion forms an exit of the second passing through hole and has a second diameter larger than the first diameter.

Also, it further includes a heater mounted on an steam output side of a pipe forming the first section or the second section, the heater being disposed between a decompression valve of the decompression unit and the inlet in the first section or between the decompression valve and the steam utilizing unit in the second section to raise the temperature of steam discharged from a steam input side.

Also, it further includes a projection formed on an inner peripheral surface of the pipe forming the first section or the second section and disposed between the decompression valve and the heater, the projection concentrating the steam discharged from the steam input side toward the heater.

The present disclosure having the above configurations includes a temperature raising unit having an inlet connected to an exit side of a boiler for introducing steam discharged from the exit of the boiler, and an outlet for raising the temperature of steam introduced through the inlet and discharging it; a steam utilizing unit connected to the outlet and using the steam discharged from the outlet; and a decompression unit installed at one or all of a first section and a second section, the decompression unit controlling temperature of steam while decompressing pressure of steam. Therefore, it is possible to control temperature and pressure very precisely and accurately for the production of ultra-high temperature and low pressure steam.

DETAILED DESCRIPTION

Figure 1A:
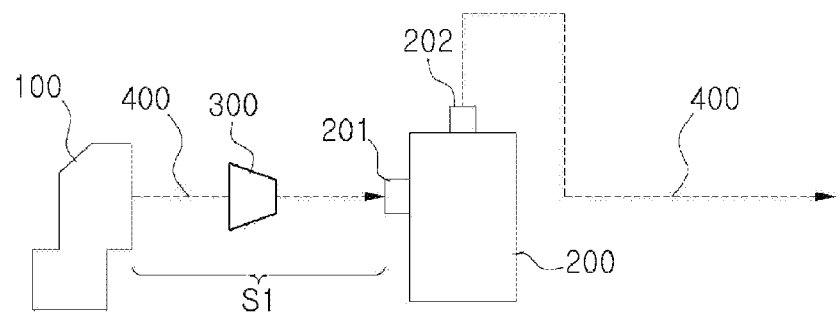
FIG. 1A to FIG. 1C is a conceptual view schematically showing an application example of a decompression apparatus for superheated steam according to various embodiments of the present disclosure.

The advantages and features of the present disclosure and methods to accomplish them will become apparent by reference to embodiments described in detail below with reference to the accompanying drawings.

However, the present disclosure is not limited to the embodiments described below, but may be embodied in various other forms.

The present embodiments are provided so that the disclosure of the present disclosure is thoroughly disclosed and that a person skilled in the art will fully understand the scope of the present disclosure.

Further, the present disclosure is defined only by the scope of the claims.

Therefore, in some embodiments, well-known components, well-known operations, and well-known techniques are not specifically described to avoid an undesirable interpretation of the present disclosure.

Also, like reference numerals refer to like elements throughout the specification. The terms (referred) used herein are intended to illustrate the embodiments and are not intended to limit the present disclosure.

Herein, singular forms include plural forms unless the context clearly dictates otherwise. The components and acts referred to as "comprise (or have)" do not exclude the presence or addition of one or more other components and acts.

Unless defined otherwise, all terms (including technical and scientific terms) used herein may be used in a sense commonly understood by a person skilled in the art to which the present disclosure belongs.

Further, the terms, which are generally used and are defined in a dictionary, are not ideally or excessively interpreted unless defined otherwise.

Hereinafter, preferred embodiments of the present disclosure will be described with reference to the accompanying drawings.

Figure 1B:
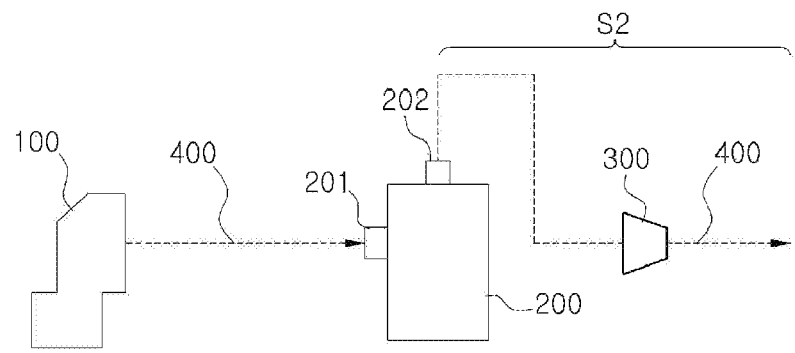
Figure 1C:
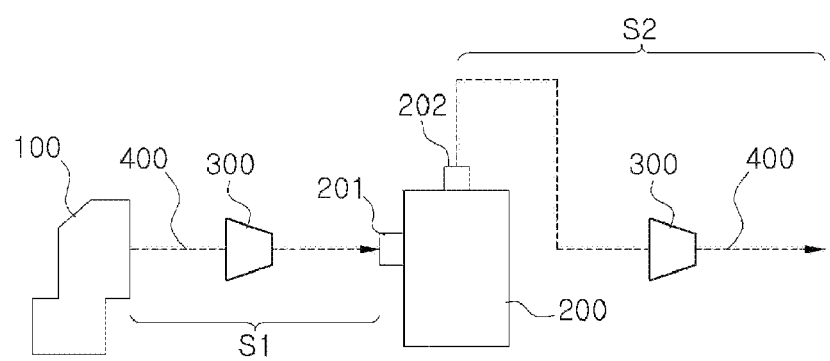

For reference, FIG. 1(a) to FIG. 1(c) is a conceptual view schematically showing an application example of a decompression apparatus for superheated steam according to various embodiments of the present disclosure.

Figure 2:
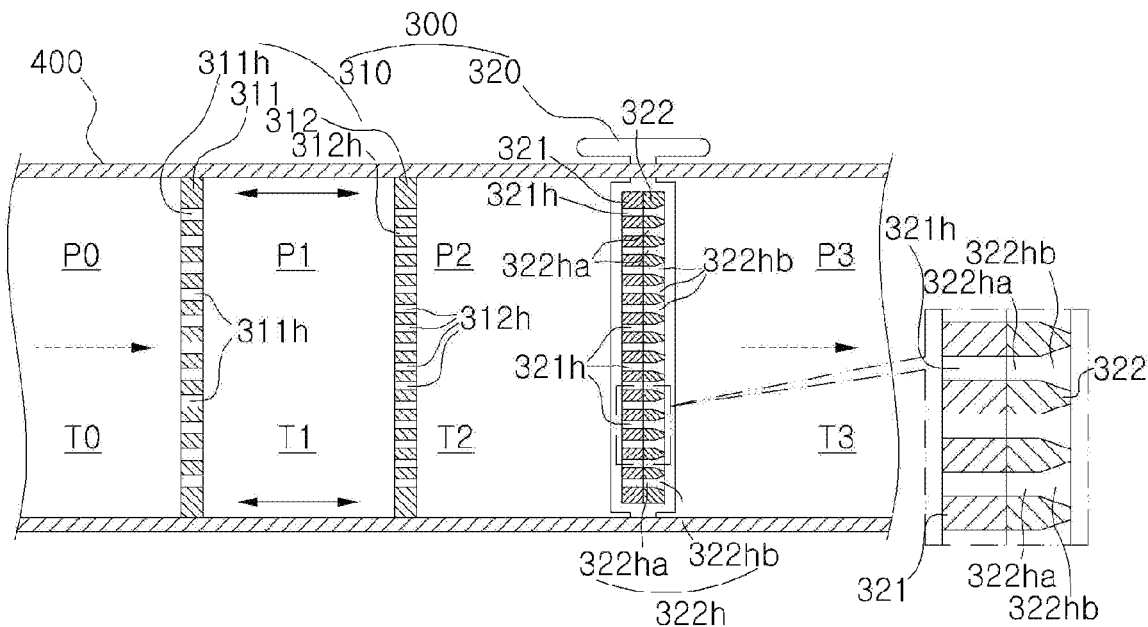
FIGS. 2 and 3 are side sectional schematic views showing the structure and operating state of a decompression unit which is the main part of a decompression apparatus for superheated steam according to an embodiment of the present disclosure.
Figure 3:
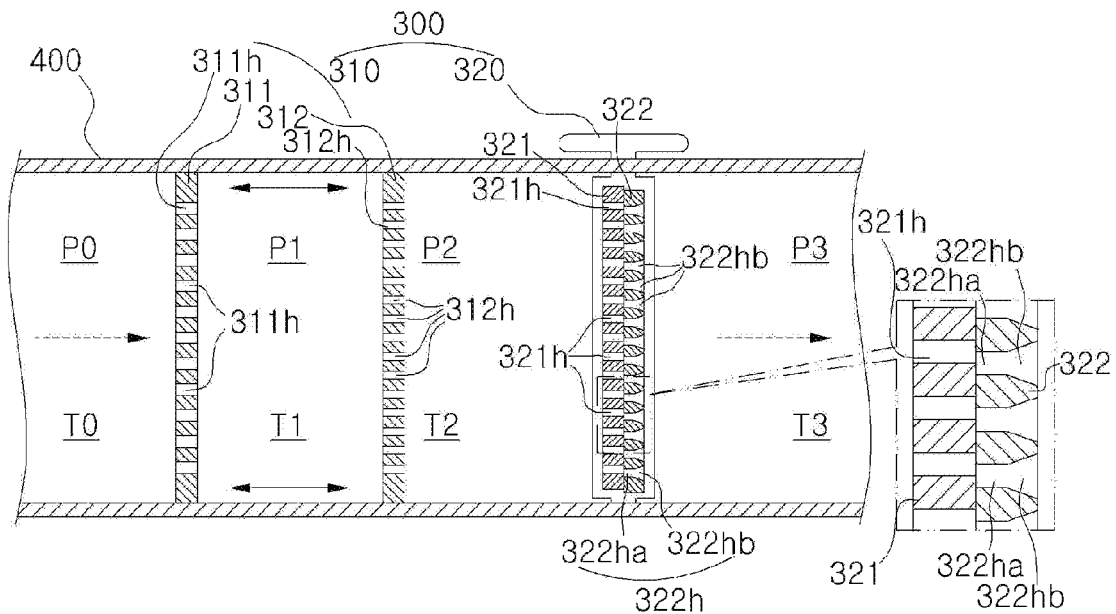
Figure 4:
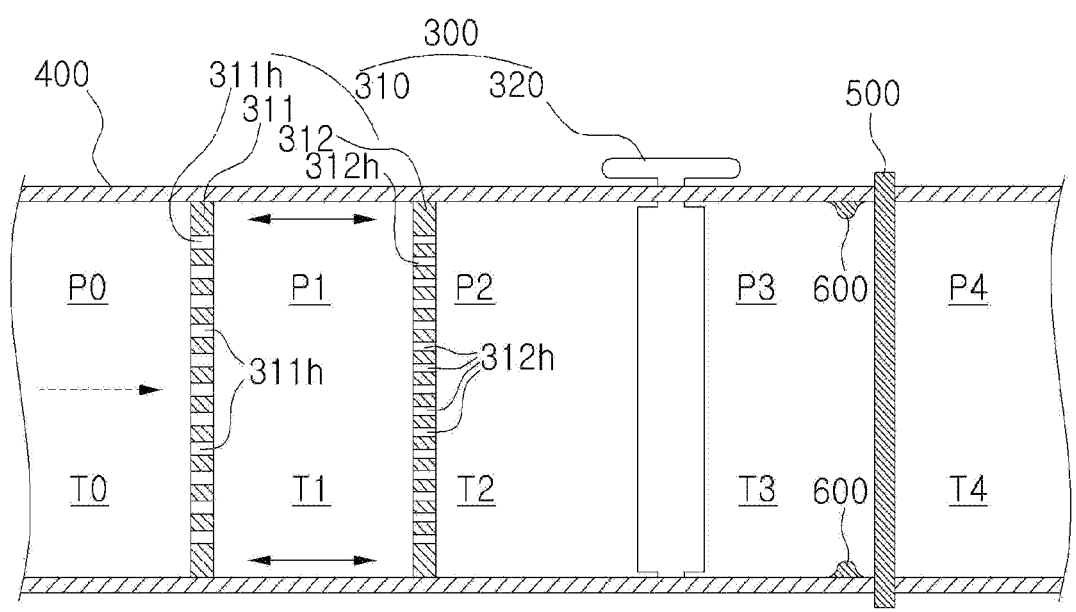
FIG. 4 is a side sectional schematic view showing the structure of a decompression unit which is the main part of a decompression apparatus for superheated steam according to a further embodiment of the present disclosure.
Figure 5:
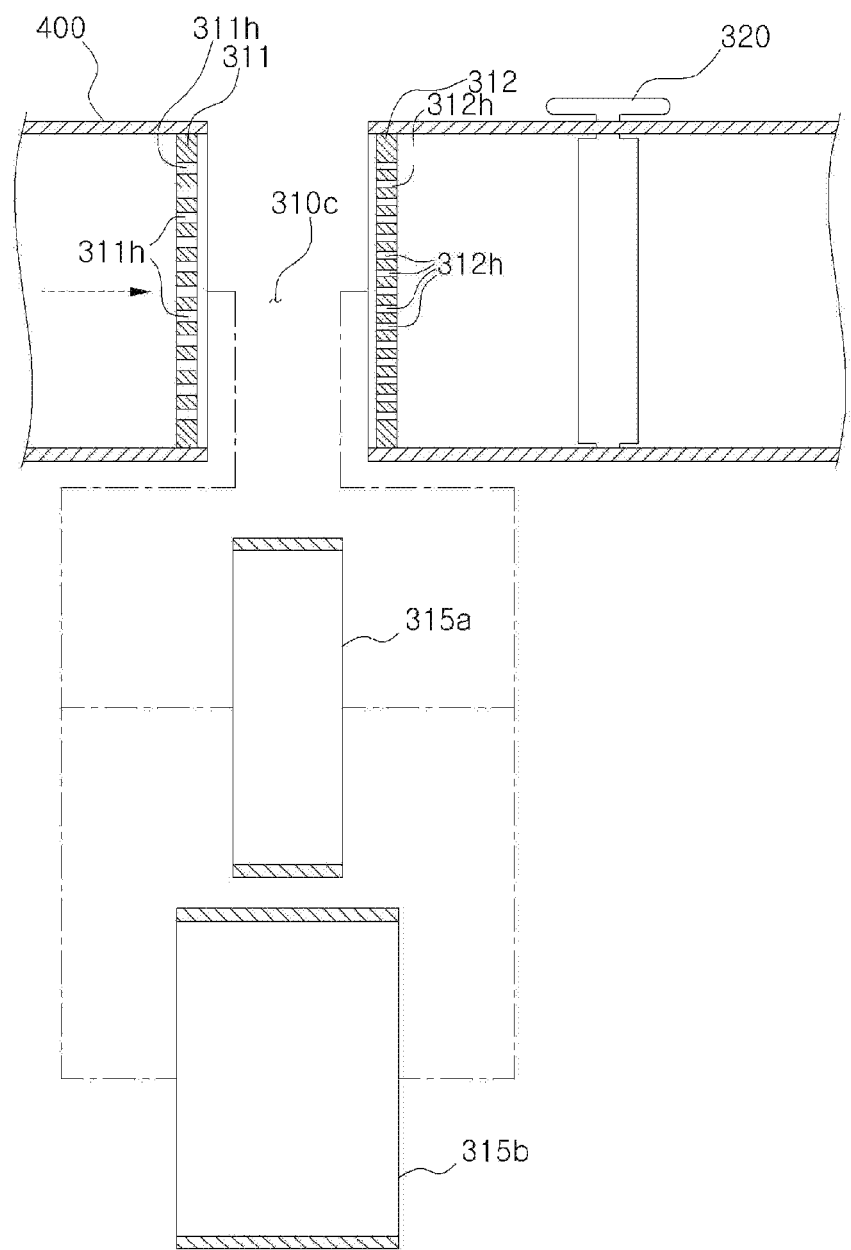
FIG. 5 is a side sectional schematic view showing the structure of a decompression unit which is the main part of a decompression apparatus for superheated steam according to another embodiment of the present disclosure.

Further, FIGS. 2 and 3 are side sectional schematic views showing the structure and operating state of a decompression unit 300 which is the main part of a decompression apparatus for superheated steam according to an embodiment of the present disclosure. FIG. 4 is a side sectional schematic view showing the structure of a decompression unit 300 which is the main part of a decompression apparatus for superheated steam according to a further embodiment of the present disclosure. FIG. 5 is a side sectional schematic view showing the structure of a decompression unit 300 which is the main part of a decompression apparatus for superheated steam according to another embodiment of the present disclosure.

As shown, it can be seen that the present disclosure has a structure in which a temperature raising unit 200 and a decompression unit 300 are provided between a boiler 100 and a steam utilizing unit (not shown). Here, the boiler 100 may be an SRF (solid refuse fuel) boiler, a gas boiler, a fossil fuel boiler, or the like. Further, the steam utilizing unit may be a variety of apparatuses (e.g., a hydrogen production unit, etc.) that directly or indirectly utilize ultra-high temperature and low pressure steam. However, hereinafter, for the sake of clarity and ease of explanation, it is intended that as an example, the boiler 100 is an SRF boiler 100, and the steam utilizing unit is a hydrogen production unit.

First, the temperature raising unit 200 is equipped with an inlet 201 connected to an exit side of the SRF boiler 100 for introducing steam discharged from the exit of the SRF boiler 100, and an outlet 202 for raising the temperature of steam introduced through the inlet 201 and discharging it.

Further, the hydrogen production unit is connected to the outlet 202 and water electrolyzes the steam discharged from the outlet 202 to produce hydrogen.

Also, the decompression unit 300 is installed in a section between an exit side of the SRF boiler 100 and the inlet 201 (hereafter, a first section S1) as shown in FIG. 1(a), or a section between the outlet 202 and the hydrogen production unit (hereinafter, a second section S2) as shown in FIG. 1(b), or the first section S1 and the second section S2 as shown in FIG. 1(c). The decompression unit 300 serves to control the temperature of steam while decompressing pressure of steam.

The embodiment as described above may be of course applied to the present disclosure, and the following various embodiments may also be applied to the present disclosure.

First, as shown in FIGS. 2 and 3, in an application, the decompression unit 300 may include a plurality of perforated plates 310 having an outer circumferential surface facing an inner circumferential surface of a pipe 400 forming the first section S1 or the second section S2, and including a plurality of perforated through hole; and a decompression valve 320 mounted on a side of a steam output end of the first section S1 or a steam output end of the second section S2 of the pipe 400, the decompression valve 320 dropping pressure of steam that is output by receiving driving force.

Here, the plurality of perforated plates 310 may include a first perforated plate 311 mounted on a steam input side of the first section S1 or the second section S2, in which a plurality of first through holes 311h are perforated in the first perforated plate 311; and a second perforated plate 312 mounted on the first section S1 or the second section S2, the second perforated plate 312 being disposed between the first perforated plate 311 and the decompression valve 320, in which a plurality of second through holes 312h are perforated in the second perforated plate 312.

Here, a diameter of the first through hole 311h may be greater than or equal to the second through hole 312h.

In addition, it is of course possible that the diameters of the plurality of first through holes 311h and the plurality of second through holes 312h may be adjusted by various methods and additional parts.

For the plurality of perforated plates 310, in an example, in addition to the first and second perforated plates 311 and 312, n perforated plates (not specifically shown) may be disposed over the first section S1 or the second base S2.

For reference, n is a positive integer of 2 or more.

The diameters of the plurality of first through holes 311h, the plurality of second through holes 312h, the plurality of n–1th through holes, and the plurality of nth through holes are adjustable.

A distance between the first perforated plate 311 and the second perforated plate 312 may be adjusted as shown by bi-directional arrows in FIGS. 2 and 3, thereby precisely adjusting the degree of decompression of the steam.

The decompression valve 320 may include a fixed perforated plate 321 and a movable perforated plate 322 as shown in FIGS. 2 and 3.

The fixed perforated plate 321 is mounted on the pipe 400 forming the first section S1 or the second section S2, and is disposed on a steam output side of the first section S1 or the second section S2, in which a plurality of first passing through holes 321h having a first diameter are formed through the fixed perforated plate 321.

The movable perforated plate 322 is lifted and lowered by receiving driving force, and is disposed in contact with the fixed perforated plate 321, in which a plurality of second passing through holes 322h having an entrance identical to the first diameter are formed through the movable perforated plate 322.

Therefore, in an initial neutral state before the driving force is transmitted, the plurality of second passing through holes 322h are disposed at positions corresponding to the plurality of first passing through holes 321h, as shown in an enlarged view of FIG. 2. When the driving force is transmitted, the plurality of second passing through holes 322h gradually decrease a cross-sectional area of the plurality of first passing through holes 321h as the movable perforated plate 322 is lifted or lowered, as shown in an enlarged view of FIG. 3.

The lifting and lowering structure of the movable perforated plate 322 is a known technique. It is ineffective to mention one of many kinds of actuators for lifting and lowering the movable perforated plate 322. Therefore, the detailed configuration and operation process will not be described here.

Referring to FIGS. 2 and 3, it can be seen that each exit of the plurality of second passing through holes 322h has a second diameter larger than the entrance of the first diameter as described above.

In other words, the plurality of second passing through holes 322h may include a diameter retaining portion 322ha for retaining the first diameter from the entrance, the diameter retaining portion 322ha being formed toward the steam output side by a certain distance orthogonally to both sides of the movable perforated plate 322; and a diameter enlarging portion 322hb that gradually enlarges from an end of the diameter retaining portion 322ha toward the steam output side.

Therefore, an end of the diameter enlarging portion 322hb will form an exit of the second passing through hole 322h and have a second diameter larger than the first diameter.

Further, internal pressures P0~P4 of the pipe 400 forming the first section S1 or the second section S2 gradually decrease from the steam input side P0 to the steam output side P3 or P4.

In addition, the internal temperatures T0~T4 of the pipe 400 forming the first section S1 or the second section S2 gradually decrease from the steam input side T0 to the steam output side T3, in which a heater 500 may further be provided as shown in FIG. 4 so that the temperatures T3 and T4 on the steam output side become equal to each other.

In other words, the present disclosure may further include the heater 500 mounted on the steam output side of the pipe 400 forming the first section S1 or the second section S2 and is disposed between the decompression valve 320 of the decompression unit 300 and the inlet 201 in the first section S1 or between the decompression valve 320 and the hydrogen production unit in the second section S2 to raise the temperature of steam discharged from the steam input side.

Also, the present disclosure may further include a projection 600 formed on an inner peripheral surface of the pipe 400 forming the first section S1 or the second section S2 and disposed between the decompression valve 320 and the heater 500, in which the projection 600 concentrates the steam discharged from the steam input side toward the heater 500.

The heater 500 is added to the steam output side (between the section T3 and the section T4), and is provided to raise the temperature of steam that has been temperature-lowered due to the decompression as it passes through the decompression valve 320.

As shown in FIG. 5, the present disclosure may further include connecting pipes 315a and 315b which are both-end-penetrated so that the distance between the first perforated plate 311 and the second perforated plate 312 may be adjusted.

The connecting pipes 315a and 315b are for connecting incision space 310c to each other, where the incision space 310c is a space in which an area between the first perforated plate 311 and the second perforated plate 312 is removed in the pipe 400 forming the first section S1 or the second section S2. The connection pipes 315a and 315b are selectively disposed in the incision space 310c to connect a flow path of the pipe 400, and are members having different lengths.

Also, although it is not specifically shown in the present disclosure, it may be conceived a screw rod which is rotated in the forward and reverse directions by receiving the driving force. It may be conceived a manner that the first perforated plate 311 or the second perforated plate 312 capable of being moved along the screw rod, is mounted, thereby causing the distance between the first perforated plate 311 and the second perforated plate 312 to be closed to or be spaced from each other by transmission to the driving force.

It can be seen that the present disclosure as described above is based on the technical idea of providing a decompression apparatus for superheated steam which may more precisely control the pressure and temperature of steam.

In addition, numerous other variations and applications are of course possible for those skilled in the art within the scope of the basic technical teaching of the present disclosure.

REFERENCE NUMERAL

100 . . . SRF boiler
200 . . . temperature raising unit
201 . . . inlet
202 . . . outlet
300 . . . decompression unit
310 . . . perforated plate
310c . . . incision space
311 . . . first perforated plate
311h . . . first through hole
312 . . . second perforated plate
312h . . . second through hole
315a, 315b . . . connecting pipe
320 . . . decompression valve
321 . . . fixed perforated plate
321h . . . first passing through hole
322 . . . movable perforated plate
322h . . . second passing through hole
322ha . . . diameter retaining portion
322hb . . . diameter increasing portion
400 . . . pipe
500 . . . heater
600 . . . projection
S1 . . . first section
S2 . . . second section

What is claimed is:

1. A decompression apparatus for superheated steam comprising:
   a temperature raising unit having an inlet connected to an exit side of a boiler for introducing steam discharged from an exit of the boiler, and an outlet for raising the temperature of steam introduced through the inlet and discharging it;
   a steam utilizing unit connected to the outlet and using steam discharged from the outlet; and
   a decompression unit installed at one or all of a first section between the exit side of the boiler and the inlet and a second section between the outlet and the steam utilizing unit, the decompression unit controlling temperature of steam while decreasing pressure of the steam.

2. The decompression apparatus of claim 1, wherein the decompression unit comprises:
   a plurality of perforated plates having an outer circumferential surface facing an inner circumferential surface of a pipe forming the first section or the second section, and including a plurality of perforated through hole; and
   a decompression valve mounted on a side of a steam output end of the first section or a steam output end of the second section of the pipe, the decompression valve dropping pressure of steam that is output by receiving driving force.

3. The decompression apparatus of claim 2, wherein the plurality of perforated plates comprises;
   a first perforated plate mounted on a steam input side of the first section or the second section, wherein a plurality of first through holes are perforated in the first perforated plate; and
   a second perforated plate mounted on the first section or the second section, the second perforated plate being disposed between the first perforated plate and the decompression valve, wherein a plurality of second through holes are perforated in the second perforated plate,
   wherein a diameter of the first through hole is larger than the second through hole.

4. The decompression apparatus of claim 3, wherein the diameters of the plurality of first through holes and the plurality of second through holes are adjustable.

5. The decompression apparatus of claim 2, wherein the plurality of perforated plates comprises;
   a first perforated plate mounted on a steam input side of the first section or the second section, wherein a plurality of first through holes are perforated in the first perforated plate; and
   at least one nth perforated plate mounted on the first section or the second section, the nth perforated plate being disposed between an n−1th perforated plate and the decompression valve, wherein a plurality of nth through holes are perforated in the nth perforated plate,
   wherein n is a positive integer of 2 or more,
   wherein a diameter of the n−1th through hole is larger than the nth through hole.

6. The decompression apparatus of claim 5, wherein the diameters of the plurality of first through holes and the plurality of nth through holes are adjustable.

7. The decompression apparatus of claim 2, wherein the plurality of perforated plates comprises:
   a first perforated plate mounted on a steam input side of the first section or the second section, wherein a plurality of first through holes are perforated in the first perforated plate; and
   a second perforated plate mounted on the first section or the second section, the second perforated plate being disposed between the first perforated plate and the decompression valve, wherein a plurality of second through holes are perforated in the second perforated plate,
   wherein a distance between the first perforated plate and the second perforated plate is adjustable.

8. The decompression apparatus of claim 2, wherein the plurality of perforated plates comprises:
   a first perforated plate mounted on a steam input side of the first section or the second section, wherein a plurality of first through holes are perforated in the first perforated plate; and
   at least one nth perforated plate mounted on the first section or the second section, the nth perforated plate being disposed between an n−1th perforated plate and the decompression valve, wherein a plurality of nth through holes are perforated in the nth perforated plate,
   wherein n is a positive integer of 2 or more,
   wherein a distance between a distance between the n−1th perforated plate and the nth perforated plate is adjustable.

9. The decompression apparatus of claim 2, wherein the decompression valve comprises:
   a fixed perforated plate mounted on the pipe forming the first section or the second section, the fixed perforated plate being disposed on a steam output side of the first section or the second section, wherein a plurality of first passing through holes having a first diameter are formed through the fixed perforated plate; and
   a movable perforated plate capable of being lifted and lowered by receiving driving force, the movable perforated plate being disposed in contact with the fixed perforated plate, wherein a plurality of second passing through holes having an entrance identical to the first diameter are formed through the movable perforated plate,
   wherein in an initial neutral state before the driving force is transmitted, the plurality of second passing through holes are disposed at positions corresponding to the plurality of first passing through holes,
   when the driving force is transmitted, the plurality of second passing through holes gradually decrease a cross-sectional area of the plurality of first passing through holes as the movable perforated plate is lifted or lowered.

10. The decompression apparatus of claim 9, wherein in the decompression valve, each exit of the plurality of second passing through holes has a second diameter larger than the entrance of the first diameter.

11. The decompression apparatus of claim 9, wherein the plurality of second passing through holes comprises:
   a diameter retaining portion for retaining the first diameter from the entrance, the diameter retaining portion being formed toward the steam output side by a certain distance orthogonally to both sides of the movable perforated plate; and
   a diameter enlarging portion that gradually enlarges from an end of the diameter retaining portion toward the steam output side,
   wherein an end of the diameter enlarging portion forms an exit of the second passing through hole and has a second diameter larger than the first diameter.

12. The decompression apparatus of claim 1, wherein an internal pressure of a pipe forming the first section or the second section gradually decreases from a steam input side to a steam output side.

13. The decompression apparatus of claim 1, wherein an internal temperature of a pipe forming the first section or the second section gradually decreases from a steam input side to a steam output side.

14. The decompression apparatus of claim 1, further comprising a heater mounted on an steam output side of a pipe forming the first section or the second section, the heater being disposed between a decompression valve of the decompression unit and the inlet in the first section or between the decompression valve and the steam utilizing unit in the second section to raise the temperature of steam discharged from a steam input side.

15. The decompression apparatus of claim 14, further comprising a projection formed on an inner peripheral surface of the pipe forming the first section or the second section and disposed between the decompression valve and the heater, the projection concentrating the steam discharged from the steam input side toward the heater.

* * * * *